Patented Dec. 5, 1922.

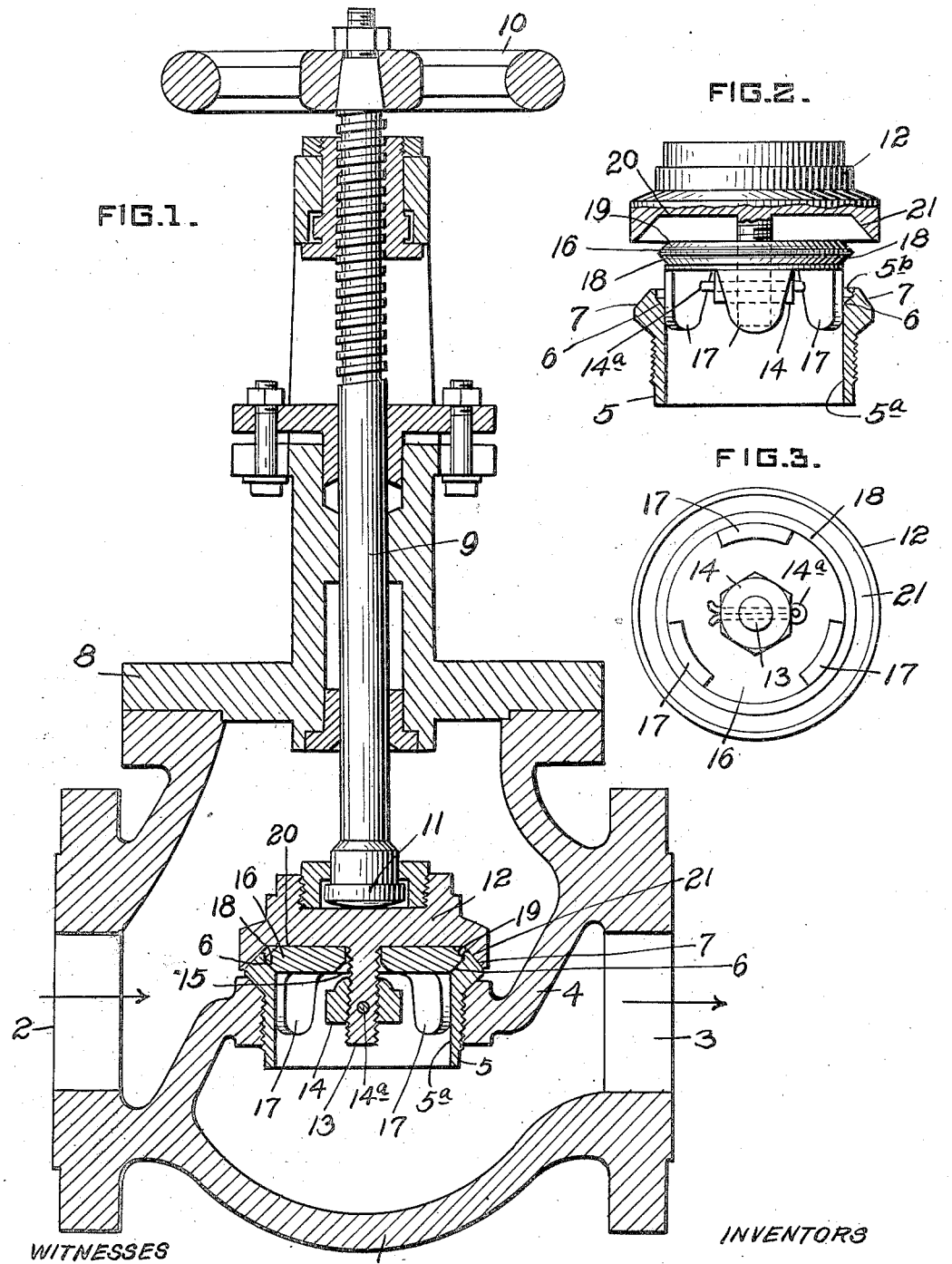

1,437,750

UNITED STATES PATENT OFFICE.

WILLIAM EHEMANN AND GUSTAV GAITSCH, OF ALIQUIPPA, PENNSYLVANIA.

VALVE.

Application filed June 29, 1920. Serial No. 392,691.

*To all whom it may concern:*

Be it known that we, WILLIAM EHEMANN, a resident of Aliquippa, in the county of Beaver and State of Pennsylvania, and GUSTAV GAITSCH, a resident of Aliquippa, county of Beaver and State of Pennsylvania, have invented a new and useful Improvement in Valves, of which the following is a specification.

This invention relates to valves.

The object of the invention is to provide a valve suitable for use in high pressure steam, or other fluid, lines, of such form that the liability of "wire drawing" or cutting the valve and its seat is reduced to a minimum. This object is attained by means of a construction illustrated in the accompanying drawings wherein Fig. 1 is a central vertical section through the valve; Fig. 2 is a partial section and perspective through the valve seats, and Fig. 3 is an under-plan view of the valve member.

The valve casing may be of any desired form, and in the present case a standard valve casing 1 is illustrated wherein there is an inlet port 2 and an outlet port 3, the casing being divided by a diaphragm 4, in the middle portion of which is an opening in which is mounted a lining member 5. This lining member has two aligned bores, the larger being at the top. The junction of the bores forms a valve seat 6. The outer upper edge of member 5 is exteriorly beveled to form another valve seat 7, as illustrated. At the top of the casing 1 is mounted a suitable cap member 8, which carries a valve stem 9, on the upper end of which is mounted a hand wheel 10, and the lower end of which is formed into a collar 11. to which is attached the main valve member 12, all in the usual manner in such structures.

The member 12 has a central threaded downward extension 13 upon which is mounted a nut 14, adapted to be retained in proper position by a cotter pin 14ª, as illustrated. The upper side of the nut 14 has a beveled face 15, upon which is adapted to rest a disc valve member 16. This disc member has a central bore which fits loosely about the projection 13, leaving the member 16 free to wobble or vibrate on the face 15 of the nut 14, as a base, when the valve is being opened or closed, as more fully explained below. The nut 14 is spaced from the member 12 so as to provide for lost motion between said member and the valve disc. A plurality of guiding projections 17 are provided on the under face of the valve member 16, and these fit loosely in the smaller bore 5ª of the member 5. The outer edge of the valve disc 16 is beveled on its underside to form a valve face 18, adapted to seat on the beveled surface 6. The upper edge of the valve disc 16 is also beveled, the two beveled edges together forming a comparatively sharp periphery adapted to make practically knife edge contact with the portion 5ᵇ of the bore of the member 5 above the valve seat 6.

The operation of the valve is as follows: When the valve is opened by turning the hand wheel 10, the stem 9 and closure member 12 are raised, thus removing the inner beveled face 21 of the member 12 from its seat 7. Thus the main valve is completely opened before the valve disc 16 is moved. As the member 12 moves upward the nut 14 comes in contact with the under surface of the valve disc 16, and thereafter further travel of the valve stem pulls the disc 16 upward, thus cracking the supplementary valve, and causing the disc to move upward in the larger bore 5ᵇ. Owing to the close fit of the sharp edge of disc 16 in the bore 5ᵇ, and to the unstable support of this disc on the beveled upper surface of the nut 14, the disc 16 will wobble, or oscillate, in either opening or closing, thus preventing the fluid passing between the faces 6 and 18 from wire drawing or cutting the metal at their contact line. The guides 17 prevent this wobbling from being great enough to damage the valve.

In closing, the disc 16 seats first, stopping the passage of fluid before the main valve gets close enough to the seat to be in danger of cutting. Manifestly, when the valve is closed it has a double seat arrangement, absolutely preventing any leakage, and reinforcing the entire structure.

It is well known in the art that wire drawing of valves occurs primarily by passage of fluid under great pressure between a valve and its seat when the two are just barely out of contact. After the valve is opened or completely closed there is no such danger, but in the act of opening or closing there is a critical stage. When this cutting occurs it makes a slight irregularity on the valve or its seat, and thereafter, even with the valve closed, a slight leakage may result, and the escape of fluid through the leak soon cuts out a larger passage and eventually destroys the valve.

Therefore it is necessary to protect the valve just at the point of closure.

The present construction does this by providing a preliminary closure of the passage by means of the valve disc 16. As this seats, or opens, it is prevented from cutting by the wobbling caused by its unstable equilibrium, and as it seats before and opens after the main outer valve, there is no possibility of the latter cutting out. Furthermore, the outer valve once closed, prevents any possible leakage through the inner valve, and renders the construction doubly safe.

The many advantages of the construction will be apparent to those familiar with the art.

We claim:

1. A valve comprising a casing having an inlet and an outlet, a partition therebetween, a port member fitted into said partition and having an interior and an exterior valve seat, a main valve member adapted to cooperate with the exterior seat, an extension on the main valve member, a supplementary valve disc loosely mounted on the extension and cooperating with the interior seat, retaining means on said extension provided with a curved surface adapted to engage the disc for unstably supporting the same, said retaining means being spaced from the main valve member so as to provide for lost motion between said member and the valve disc, the lost motion connection permitting the valve disc to seat before and leave its seat after the main valve.

2. A valve comprising a casing having an inlet and an outlet, and a partition therebetween, a port member fitted into said partition and having an interior and an exterior valve seat, a main valve member adapted to cooperate with the exterior seat, and a supplementary valve disc carried by the main valve member and adapted to cooperate with the inner valve seat, the valve disc being carried by and unstably connected to the main valve member whereby said disc is permitted to wobble and accommodate itself to the interior seat.

3. In a valve construction comprising a port, a lining member mounted in the port, two alined bores in the lining one of less dimension than the other, a beveled valve seat formed between the two bores of the lining member, a valve disc having its under edge adapted to cooperate with the beveled seat of the lining member to close the port, the periphery of the disc forming a knife-edge contact with the larger bore of the lining member, a stem adapted to lift the valve disc against pressure, and a loose connection between the stem and disc whereby the disc is permitted to wobble in the larger bore of the lining member.

4. In a valve construction comprising a casing having an inlet and an outlet port and a diaphragm therebetween, a port through said diaphragm, a tubular member mounted in the port and having two alined bores, one of less dimension than the other, a valve seat connecting the larger and smaller bores of the tubular member, a valve seat formed by the end of the tubular member, a valve disc adapted to cooperate with the seat in the tubular member to close the opening therethrough, the periphery of said disc forming a sliding contact with the larger bore of the tubular member, a main valve member having a flange adapted to cooperate with the end of the tubular member to close the port, a projection from the underside of the main valve member extending loosely through an opening in the valve disc, and a nut on the projection, said nut having its inner face beveled to form an unstable support for the valve disc, and means to raise and lower the main valve member.

5. A valve construction comprising a port, a lining member for the port having two aligned bores, one of less dimension than the other, a valve seat formed at the junction of the two bores, a valve disc adapted to cooperate with said seat to close the port, a stem for controlling the movement of said disc, said disc being loosely mounted on said stem and making knife-edge contact about its periphery with the larger bore of said lining member.

6. In a valve construction comprising a casing having an inlet and an outlet opening, an intermediate partition and a port through the partition, the combination of a lining member for said port having two aligned bores, one of less dimension than the other, the junction of the two bores forming a valve seat, and a second seat formed on the outside of the lining member, a main valve adapted to seat on the outside of the lining member, a supplementary valve disc having its periphery fitting the larger bore and adapted to seat inside the lining member, said supplementary valve disc being carried on an extension from the main valve member by a lost motion connection whereby the valve disc seats before and leaves its seat after the main valve, and said valve disc being unstably mounted on said extension.

In testimony whereof, we have hereunto set our hands.

WILLIAM EHEMANN.
GUSTAV GAITSCH.

Witness:
Jo. BAILY BROWN.